United States Patent
Vishal et al.

(10) Patent No.: US 11,087,153 B2
(45) Date of Patent: Aug. 10, 2021

(54) TRAFFIC LIGHT RECOGNITION SYSTEM AND METHOD

(71) Applicant: Cognizant Technology Solutions India Pvt. Ltd., Chennai (IN)

(72) Inventors: Kumar Vishal, Benares (IN); Arvind Channarayapatna Srinivasa, Bengaluru (IN); Ritesh Mishra, Bengaluru (IN); Venugopal Gundimeda, Hyderabad (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 129 days.

(21) Appl. No.: 16/559,104

(22) Filed: Sep. 3, 2019

(65) Prior Publication Data
US 2020/0134333 A1   Apr. 30, 2020

(30) Foreign Application Priority Data
Oct. 31, 2018   (IN) .............. 201841041145

(51) Int. Cl.
*G06K 9/00* (2006.01)
*G06K 9/62* (2006.01)
(Continued)

(52) U.S. Cl.
CPC ....... *G06K 9/00825* (2013.01); *G06K 9/4652* (2013.01); *G06K 9/6231* (2013.01);
(Continued)

(58) Field of Classification Search
None
See application file for complete search history.

(56) References Cited

U.S. PATENT DOCUMENTS

| 9,619,720 B2 | 4/2017 | Liken |
| 2012/0233841 A1* | 9/2012 | Stein ............. G03B 17/02 29/428 |

(Continued)

FOREIGN PATENT DOCUMENTS

| CN | 107430818 A | 12/2017 |
| WO | 20180290066 A1 | 2/2018 |

OTHER PUBLICATIONS

Saini S, Nikhil S, Konda KR, Bharadwaj HS, Ganeshan N. An efficient vision-based traffic light detection and state recognition for autonomous vehicles. In2017 IEEE Intelligent Vehicles Symposium (IV) Jun. 11, 2017 (pp. 606-611). IEEE. (Year: 2017).*

(Continued)

*Primary Examiner* — Kim Y Vu
*Assistant Examiner* — Nathan J Bloom
(74) *Attorney, Agent, or Firm* — Cantor Colburn LLP

(57) ABSTRACT

The present disclosure is directed to a traffic light recognition system and method for advanced driver assistance systems (ADAS) and robust to variations in illumination, partial occlusion, climate, shape and angle at which traffic light is viewed. The solution performs a real time recognition of traffic light by detecting the region of interest, where extracting the region of interest is achieved by projecting the sequence of frames into a kernel space, binarizing the linearly separated sequence of frames, identifying and classifying the region of interest as a candidate representative of traffic light. With the aforesaid combination of techniques used, traffic light can be conveniently recognized from amidst closely similar appearing objects such as vehicle headlights, tail or rear lights, lamp posts, reflections, street lights etc. with enhanced accuracy in real time.

22 Claims, 3 Drawing Sheets

(51) Int. Cl.
  *G06T 7/90* (2017.01)
  *G06T 7/73* (2017.01)
  *G06K 9/46* (2006.01)

(52) U.S. Cl.
  CPC ............ *G06K 9/6286* (2013.01); *G06T 7/75* (2017.01); *G06T 7/90* (2017.01); *G06T 2207/10016* (2013.01); *G06T 2207/10024* (2013.01)

(56) References Cited

U.S. PATENT DOCUMENTS

| | | | | |
|---|---|---|---|---|
| 2016/0148063 | A1* | 5/2016 | Hong | G06K 9/6267 382/103 |
| 2017/0206427 | A1 | 7/2017 | Ginsberg | |
| 2018/0189577 | A1* | 7/2018 | Yoo | G06K 9/00798 |
| 2018/0225968 | A1* | 8/2018 | Wang | G01S 19/45 |
| 2019/0102876 | A1* | 4/2019 | Sanders | G01N 21/78 |

OTHER PUBLICATIONS

Agrawal S, Chaurasiya RK. Automatic traffic sign detection and recognition using moment invariants and support vector machine. In2017 International Conference on Recent Innovations in Signal processing and Embedded Systems (RISE) Oct. 27, 2017 (pp. 289-295). IEEE. (Year: 2017).*

Gudigar A, Jagadale BN, Mahesh PK, Raghavendra U. Kernel based automatic traffic sign detection and recognition using svm. InInternational Conference on Eco-friendly Computing and Communication Systems Aug. 9, 2012 (pp. 153-161). Springer, Berlin, Heidelberg. (Year: 2012).*

Y. Chen, N. M. Nasrabadi and T. D. Tran, "Hyperspectral Image Classification via Kernel Sparse Representation," in IEEE Transactions on Geoscience and Remote Sensing, vol. 51, No. 1, pp. 217-231, Jan. 2013, doi: 10.1109/TGRS.2012.2201730. (Year : 2013).*

Mythili C, Kavitha V. Color image segmentation using ERKFCM. International Journal of Computer Applications. Jan. 1, 2012;41(20). (Year: 2012).*

Chen, Y.-N.; Hsieh, C.-T.; Wen, M.-G.; Han, C.-C.; Fan, K.-C. A Dimension Reduction Framework for HSI Classification Using Fuzzy and Kernel NFLE Transformation. Remote Sens. Oct. 2015, 7, 14292-14326. https://doi.org/10.3390/rs71114292 (Year: 2015).*

Behrendt, K., Novak, L., & Botros, R. (2017). A deep learning approach to traffic lights: Detection, tracking, and classification. 2017 IEEE International Conference on Robotics and Automation (ICRA), 1370-1377.

Fairfield, N., & Urmson, C. (2011). Traffic light mapping and detection. 2011 IEEE International Conference on Robotics and Automation, 5421-5426.

Shi, Z., Zou, Z., & Zhang, C. (2016). Real-Time Traffic Light Detection With Adaptive Background Suppression Filter. IEEE Transactions on Intelligent Transportation Systems, 17, 690-700.

\* cited by examiner

TRAFFIC LIGHT RECOGNITION SYSTEM AND METHOD

CROSS REFERENCE TO RELATED APPLICATION

This application is related to and claims the benefit of Indian Patent Application Number 201841041145 filed on Oct. 31, 2018, the contents of which are herein incorporated by reference in their entirety.

FIELD OF INVENTION

The subject matter described herein, in general, relates to traffic light recognition system and method, and, in particular, relates to a system and method for identification and recognition of traffic light from amidst plurality of other similar objects for enhanced driving experience.

BACKGROUND OF INVENTION

The number of vehicles present on road today exhibits the success of automotive vehicles, however it also raises the concern towards passenger safety at large. Technological advancement towards advance driver assistance systems (ADAS) to have a check on safety parameters are emerging faster than ever before. Challenges thrown by urban areas for an ADAS are numerous and way complicated. It requires sophisticated set of algorithms to address those challenges ranging from path planning, collision avoidance to perception and so on. As universally acknowledged, Traffic light recognition (TLR) is one of the critical components of the perception system.

Identification of traffic lights in urban scenarios is never an easy problem, primarily because of small size of these lights and their close similarity with other objects such as vehicle's tail lights, lamp posts, reflections, street lights etc. To overcome such complexities, many researchers are relying on two prevalent technologies: (i) communication-based and (ii) vision-based, methods. The communication-based method can utilize vehicle to vehicle (V2V) communication or vehicle to infrastructure (V2I) communication to convey traffic light states.

Some methods have proposed intelligent transportation system (ITS) where vehicle can receive reliable information of current state and other information. However, such smart systems require substantial investment for the installation of wireless devices and other hardware devices in all traffic lights, intersections and vehicles. Thus, realization of ITS at significant market needs sometime till pre-requisites such as new infrastructure, secure-communication networks etc. are fulfilled.

On the other hand, ubiquitous presence and low cost of camera sensor makes vision based method more popular among the researchers. Some vision based systems along with prior knowledge of traffic light position (map information and height) provided through sensors like Global Positioning System (GPS) have been used to obtain high accurate results. Though GPS information fused with camera sensors helps to constrain the traffic light search region in input image, this accuracy comes with a price of pre-mapping every traffic light location. Underlining assumption would be that a prior knowledge of global location of each such traffic light is available during detection from a GPS system. Traffic light mapping procedure (on input image) depends on accurate GPS and camera calibration. GPS error, network overload etc. are some of the disadvantages of GPS system which can intervene in the accuracy of overall approach.

Further, exploration shows vision based methods relying only on geometrical features, color spaces sensitive to illumination variations, template matching, image segmentation or edge information are not good enough to recognize the traffic lights with high accuracy. Moreover, exploration states various challenges associated with traffic light recognition owing to several reasons. Firstly, some of these methods rely on RGB color space to identify red/green signal candidates in input images at the very initial stage, which makes the results inadvertently sensitive to variations in illumination, view-angle, prevailing weather, shape perceived by ego-vehicle from the angle of traffic light viewed, and other such conditions. Secondly, most of the proposed methods fail to address and mark the vehicle rear light or tail light as non-traffic light that may lead to their incorrect detection as red signal of traffic light.

Overall, the color and geometrical information can vary from scene to scene because of illumination and occlusion, hence the model may be challenged based on color and templates. In recent years, with increase in processing capabilities, accessibility of large amounts of data and advancements in statistical modeling, there is a paradigm shift towards learning based approaches from basic image processing. The learning based approaches open the gateway to explore better methods and provide an end to end solution for recognizing traffic lights with reduced false positives and increased accuracy.

Further, need for real time recognition with low misclassification rate is posited whereby challenges of traffic light's small size and high resemblance with surrounding light sources are adequately thwarted with enhanced accuracy even when tested in different conditions and scenarios. In the background of aforementioned limitations, there exists a need for an efficient and light weight false positive elimination system and method capable of recognizing traffic lights while being robust to peculiar variations in real time.

OBJECTS OF THE INVENTION

The primary object of the present disclosure is to provide a system and method for traffic light recognition using vision sensors in real time.

Another object of this disclosure is to provide an intelligent and cost-effective system and method that utilizes ubiquitously present low cost camera sensors for traffic light recognition in most weather conditions.

Yet another object of the disclosure is to provide accurate and efficacious traffic light recognition system and method less susceptible to variations in illumination, partial occlusion, climate, shape and angle at which traffic light is viewed.

Yet other object of the present disclosure is to provide an efficient and light weight false positive elimination method that uses kernel space for traffic light candidate detection.

In yet another embodiment, the disclosure provides a dynamic system and method of traffic light recognition with low false negative and false positive rates allowing the driver to easily distinguish between the traffic light and other similar objects including vehicle rear or tail light, street lights, reflections, or any imaginary light.

Still another embodiment of present disclosure provides an automated system and an up stream process of recognizing traffic light that exploits saturation and luminance value of entities to distinguish from other objects present in environment.

These and other objects will become apparent from the ensuing description of the present invention.

SUMMARY OF THE INVENTION

According to one significant aspect of the present disclosure, a traffic light recognition system is provided. Broadly, the system comprises of a kernelization module, a binarization module, a decision tree module and a classification module. The kernelization module, in one aspect of the disclosure, is configured to receive a sequence of frames captured by an imaging device, and project the sequence of frames into a kernel space. Next, the binarization module is configured to binarize, based on a dynamically determined threshold, the sequence of frames separated in the kernel space. Now, the decision tree module is configured to identify a set of candidate blobs in the binarized sequence of frames based on a set of predefined features. Finally, the classification module is configured to determine if the identified set of candidate blobs is a candidate for representing a traffic light.

According to another significant aspect of present disclosure, the kernelization module is configured to make the sequence of frames comprising at least one region of interest linearly separable from the environment thereof based on their characteristic properties. In one particular aspect of present disclosure, such characteristic properties include luminance and saturation properties of plurality of pixels constituting the sequence of frames within at least one region of interest.

In accordance with one other significant aspect of present disclosure, a method for traffic light recognition is depicted. The method comprising steps of receiving a sequence of frames captured by an imaging device; projecting the sequence of frames into a kernel space; binarizing, based on a dynamically determined threshold, the sequence of frames separated in the kernel space; identifying a set of candidate blobs in the binarized sequence of frames based on a set of predefined features; and determining if the identified set of candidate blobs is a candidate for representing a traffic light.

DETAILED DESCRIPTION OF THE EMBODIMENTS

Figure 1:
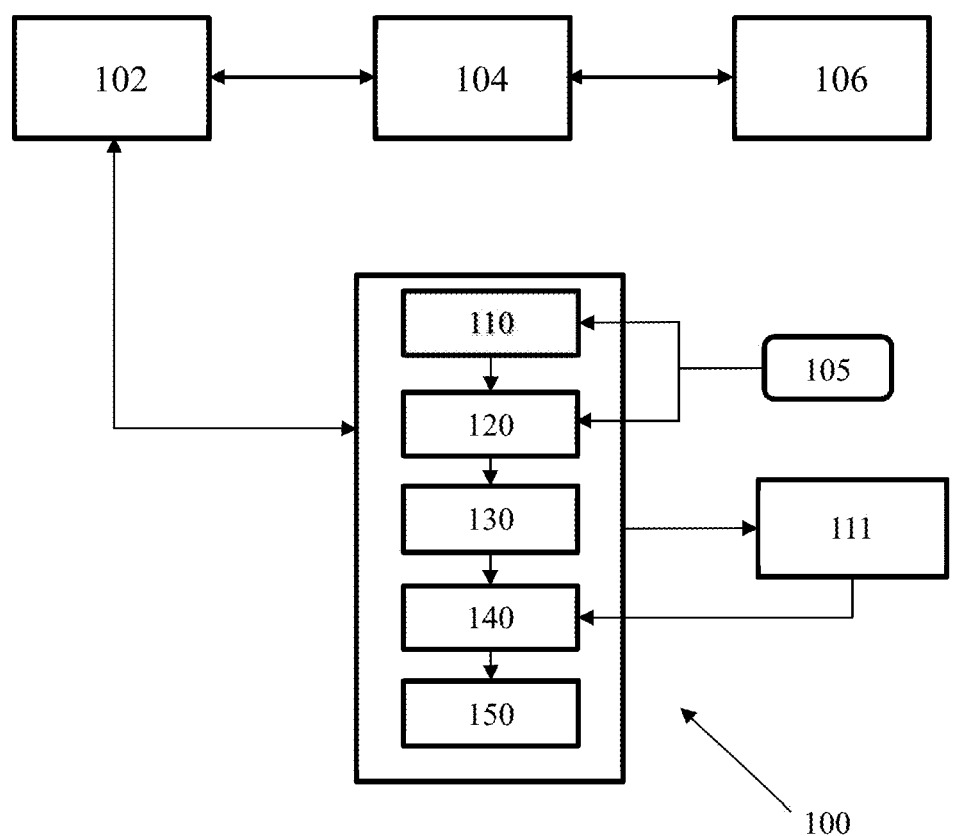
FIG. 1 is a block diagram illustrating a traffic light recognition system, in accordance with a preferred embodiment of the present disclosure.

It has to be understood and acknowledged for the purposes of this disclosure that the figures and description provided herein include the necessary information for one skilled in the art to carry out embodiments of the invention, including the disclosed methods and systems. Example methods and systems are described herein. Any example embodiment or feature described herein is not necessarily to be construed as preferred or advantageous over other embodiments or features. The example embodiments described herein are not meant to be limiting. Those skilled in the art may recognize that other components/sub-components and steps/sub-steps may be desirable or necessary to implement embodiments of the invention in its various forms. As such, various steps, components and different configurations that are deemed known by one skilled in the art are inherently contemplated herein in this disclosure.

In describing the preferred and alternate embodiments of the present disclosure, specific terminology is employed for the sake of clarity. The disclosure, however, is not intended to be limited to the specific terminology so selected, and it is to be understood that each specific element includes all technical equivalents that operate in a similar manner to accomplish similar functions. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. The disclosed embodiments are merely exemplary methods of the invention, which may be embodied in various forms.

According to the illustrative embodiment of present disclosure, a method and system for traffic light recognition (TLR) has been provided. It shall be appreciated that TLR constitutes an integral component of an intelligent autonomous vehicle and advance driver assistance systems (ADAS). As will be described herein, the approach has been based on use of vision sensors that facilitates smart and safe driving by providing accurate notifications and alerts in real time.

In one exemplary embodiment of present disclosure, recognition of traffic light candidate involves projecting the sequence of frames into kernel space, binarizing based on a dynamically determined threshold to the sequence of frames separated in kernel space and performing decision tree analysis over the set of candidate blobs and vehicle detection results. In order to eliminate false positives, light weight efficient classifier model performing hard negative mining is provided. Classification of traffic light state is achieved by using any good supervised machine learning methodology, one such example may be using a support vector machine (SVM) with RGB histogram of the cropped ROI used as a feature.

The present invention is described below with reference to methods and systems in accordance with general embodiments of present disclosure. The instructions may be loaded into the system, which when executed upon such a computer implemented system—a general purpose computer or a special purpose hardware based computer systems, creates means for training the system and implementing functions of various modules hosted by the system.

FIG. 1 is a functional block diagram of an exemplary system 100 that provides a suitable environment for implementing embodiments of present disclosure. Following the illustration, the architecture of system 100 is shown to comprise of various subsystems such as central processing unit (CPU) 102 coupled to random access memory (RAM) 104 to execute instructions stored therein, read-only memory (ROM) 106, various sub routines to transmit information between the subsystems. The one or more processing systems and subsystems are interconnected and include plurality of elements vis-à-vis search area minimization module 110, kernelization module 120, binarization module 130, decision tree 140, and classification module 150 for performing variety of actions associated with recognition of traffic light in real time.

In general, at first the imaging device 105 is configured to capture a plurality of sequence of frames (K) of the front, side and other probable field of view from a vehicle at any given time. In one exemplary embodiment, the imaging device 105 is mounted on a partially or fully autonomous vehicle. For example, in an autonomous mode the vehicle mounted with an imaging device 105, say camera may be configured to capture a sequence of frames without any human interaction. These sequence of frames are transmitted to the kernelization module 120 and determined for at least one region of interest (ROI).

In one alternate embodiment of present disclosure, search area minimization module 110 is provided that is configured to reduce the search area of traffic light detection within a sequence of frames captured by the imaging device 105 and enhance the throughput. Though the results are achievable manually as one may heuristically determine and locate areas e.g. road-sections to remove from search part for locating candidates i.e. Traffic-light; major drawback of this process is that during camera setup on any autonomous Vehicle, the "pitch axis" of camera mount changes each time, which consequently changes the "road-section" captured area within frame, and compels one to calculate new road-section heuristically each time. Now, in order to automate this process, horizon detection method is proposed for predicting the vanishing point and locating the "road-section" or any of known techniques in art may be proposed for locating the "road-section" and removing it adaptively frame-by-frame.

However, in one exemplary embodiment, vehicle detection is performed before proceeding to kernelization module 120, so as to quickly get rid of vehicle's rear lights that have high probability of being extracted as traffic lights. Re-referring to FIG. 1, vehicle detection is performed by vehicle detection module 111, and all region of interests that have intersection with vehicular region of interest (VROI) are eliminated. Different methodologies may be adopted to perform vehicle detection. For the purposes of this disclosure, and in accordance with one working embodiment, deep learning based vehicle detection is deployed to suppress false positive candidates created by other vehicle rear/tail light. However, the vehicle detection may be performed using any of the known techniques in art, and shall not be construed to be limited to deep learning based method.

Now, the kernelization module 120 is configured to make linearly separable the sequence of frames having one or more region of interest(s) from environment thereof based on characteristic properties of the pixels constituting the sequence of frames. In one noteworthy embodiment, the disclosure attempts to explore saturation and luminance values of traffic light and other light sources as these features make these entities easily distinguishable from other regions in environment because of their high saturation and luminance value.

Thus, in order to identify traffic signal candidates in the received sequence of frames, instead of targeting Red/Green color components directly, brightness property of any light source mixed with colorfulness is utilized for source identification. Accordingly, saturation and luminance components are boosted by the kernelization module 120 as they are more robust to illumination variation (brightness, shadow etc.), view-angle, and climatic changes desired for achieving correct result.

In one particular embodiment of this disclosure, once projected into a kernel space by the kernelization module 120, these deterministic and characteristic properties of luminance and saturation of the constituting pixels play a pivotal role in linearly separating the regions of interest (ROI) from environment thereof. Usually, these high luminance and saturation value pixels belong to traffic light, vehicle tail light, headlights, tail lights, street lights, pedestrian lights, vehicular parking lights or a combination of these lights or any other road sign associated with directing traffic control.

Figures 2A, 2B:
FIGS. 2(a) and 2(b) provide an illustration of extracting high luminance and saturation source, in accordance with one preferred embodiment of present disclosure.

As can be seen clearly in FIGS. 2(a) and 2(b) a projection of a test sample RGB image to kernel space (Z) is depicted. Following from the figures, once the sequence of frames is projected into a new kernel space, any light sources and entities similar to traffic light are made linearly separable from other regions with a Hyperplane. The merits being that now it becomes convenient to obtain a set of weights corresponding to the decision boundary hyperplane. To elaborate, the specifics of the Kernel Function (Z) are discussed. Here, the kernelization module 120 is configured to compute a kernel function for all combinations of luminance and saturation values based on an expression which is mathematically correspondent to:

$$Z1 = pow(S,n) >> 32$$

$$Z2 = \{L >= Th; \text{ else } 1$$

$$Z = Z1 * Z2$$

Where:
S=Saturation value of a pixel
n=5,6 (Hyper parameter which needs to be tune for the value 5 or 6)
L=Luminance of pixel;
Th=65, Threshold value.

Usually, finding kernel space for each pixel within the sequence of frames (avg image containing ~2Lac pixels) is a time consuming process. To speed up the calculation and make the application in real time, Look Up Table (LUT) based approach can be used. Here, Z for all the possible combination of Saturation (0-255) and Luminance (0-255) is computed and stored in MATRIX of 255 by 255. This approach makes the conversation of the sequence of frames to a kernel space in Linear Time by avoiding all the heavy calculations at test time.

Following next, the binarization module 130 receives the sequence of frames having region of interests, separated in kernel space, for binarization based on a dynamically determined threshold. In some instances, to find threshold dynamically at run time, counting sort technique is introduced, using which threshold computation for Binarization is achieved in linear time. Counting sort technique exploits the fix data range property, which is of much relevance in this case as range of Saturation and Luminance varies only between 0 to 255.

In one working embodiment, the image intensity invariant binarization method is adopted to eliminate most of the contents of frame which doesn't qualify as a light source. It shall, however, be followed that any of known binarization methods may be used, as the disclosure is not necessarily limited to disclosed technique. Most importantly, the sequence of frames is binarized by retaining top 1 percentile as the dynamically determined threshold. Next, this top 1 percentile is fed to a decision tree module 140 that performs the first level of false positive elimination, whereby it identifies a set of candidate blobs within the binarized sequence of frames based on a set of predefined features. Consequently, some blobs that are not likely to be traffic light candidates owing to their differing geometric parameters are filtered out. For example, the candidate blobs in a range corresponding to less than or equal to 2 pixels may be filtered out in this case.

Figure 3:
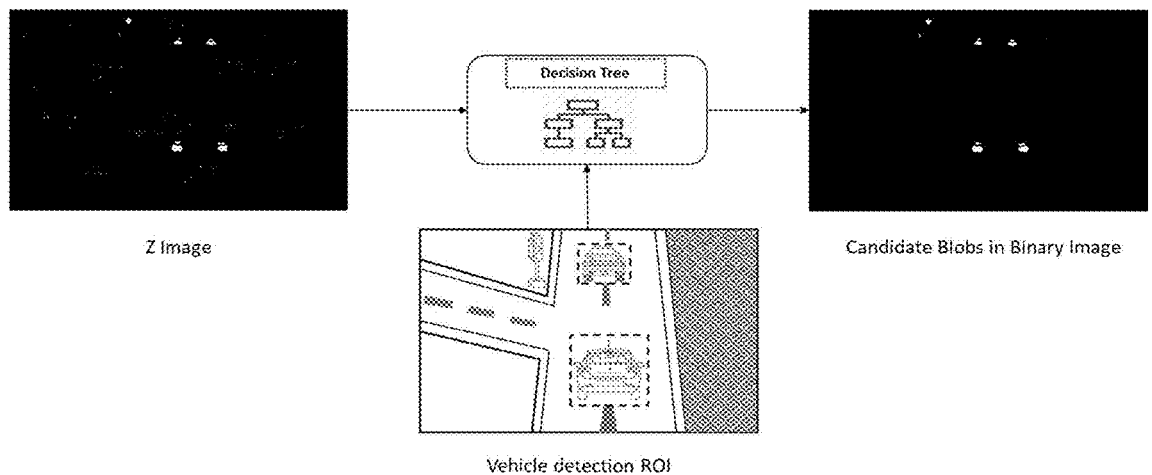
FIG. 3 depicts the schematic diagram displaying the predefined features and decision tree output, in accordance with one preferred embodiment of present disclosure.

In one exemplary embodiment of present disclosure, these candidate blobs are identified based on a set of predefined features that reject the binary shapes which doesn't qualify in the criteria marked by the predefined features. These features correspond to geometric parameters such as a minimum and/or maximum size bound of blob with respect to image resolution, height, width, shape, width to height ratio and other mensuration parameters for example width to height ratio in range of (0.8~1.25) or pixel ranges (3~100) for image resolution of 1280×720 along with earlier detected vehicular regions by the vehicle detection module 111 as shown in FIG. 3.

In one alternate embodiment of present disclosure, the vehicle detection may be performed post identification of candidate blobs for elimination of vehicle's rear lights as false positives. While the approach for performing the vehicle detection remains same (discussed in detail in aforementioned paragraphs), the stage at which it is performed may be selected as per user's convenience and usage.

Next, the identified set of candidate blobs is fed to a classification module 150 that is configured to determine if the identified set is a candidate representative of three lightening elements, namely Red, Yellow or Green space of traffic light color scheme. This is a second level of false positive elimination performed by the classification module 150 whereby these candidate blobs are mapped back to the original sequence of frames to determine if the candidates are a suitable candidate representative of a traffic light and can be classified into any of Red, Green or Yellow categories.

One working embodiment of present disclosure explains the above process for false positive elimination by any classifier which may be a supervised machine-learning tool such as support vector machines (SVM). The classifier may be trained using training data that can associate certain predefined features with certain categories. For instance, the traffic light candidate blobs may be projected from decision tree output image to corresponding captured image (K) and the training samples may be collected via hard negative data mining. This process may be referred to herein as "training the classifier."

In one exemplary embodiment, histogram of the traffic light candidate blobs of size 96 bins mapped to RGB image is considered as a feature for the SVM classifier. Other sets of example candidate blobs may be provided in order to train the classifier to identify a plurality of categories associated with recognition of traffic light.

Figure 4:
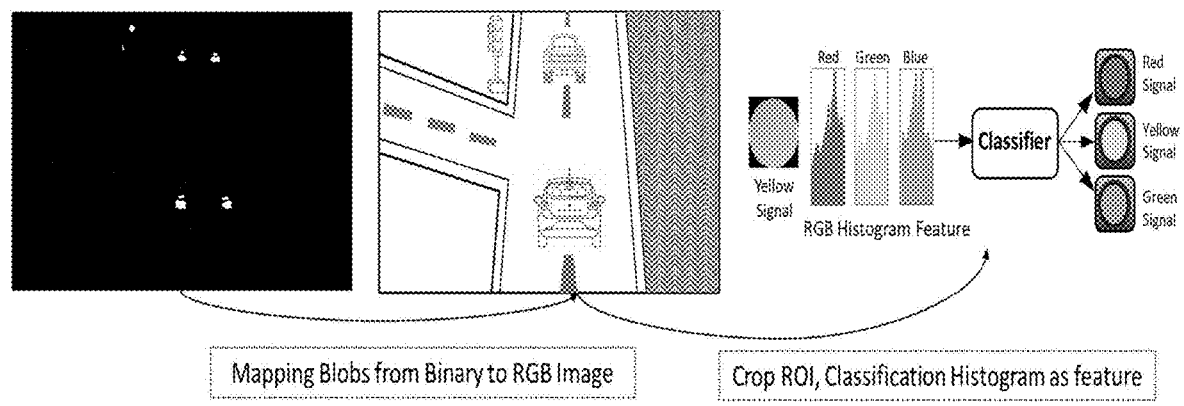
FIG. 4 is a schematic diagram showing traffic light classification, in accordance with one preferred embodiment of present disclosure.

As discussed above, the SVM classifier is configured to perform classification of the traffic lights as Red, Yellow or Green. However, prior to classification, in order to train the model, the cropped candidate blobs are mapped back to original RGB image as shown in FIG. 4. In one exemplary embodiment, RGB histogram of the candidate blob by concatenating 32 bins/channel is used as a feature. Further, grid search is performed to tune C and γ. The processing system may also use other example supervised machine-learning tools.

Figure 5:
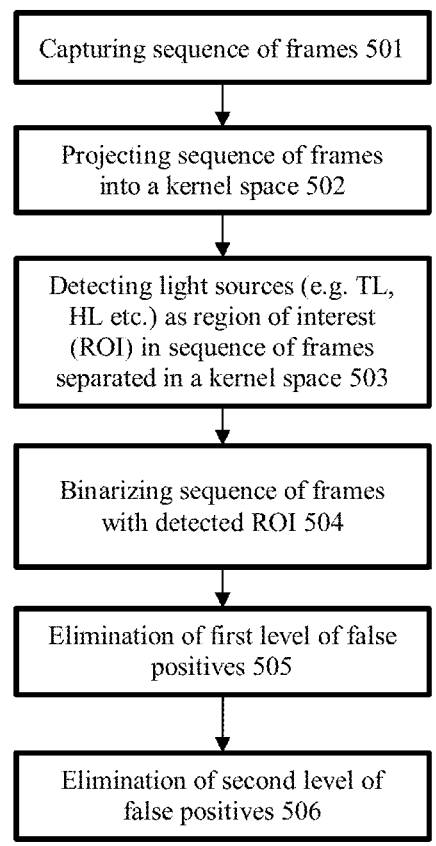
FIG. 5 illustrates a schematic flow chart for traffic light recognition, in accordance with one preferred embodiment of present disclosure.

Referring now to FIG. 5, a detailed methodology for traffic light recognition has been illustrated. At step 501, plurality of sequence of frames are captured by the imaging device 105 of the area surrounding it. Next, in step 502, these sequence of frames are projected into a kernel space and made linearly separable from the environment thereof based on characteristic properties of the pixels constituting the sequence of frames.

In one exemplary embodiment, these deterministic and characteristic properties include saturation and luminance values which makes any light sources and the traffic light representative regions easily distinguishable from other regions. Further, these characteristic properties of saturation and luminance are more robust to illumination variation (brightness, shadow etc.) view-angle, and climatic changes desired for achieving correct result.

These sequence of frames which are projected into a kernel space are, thus, detected for regions of interest (ROI), which in general refers to traffic light (TL), vehicle tail light, headlights (HL), tail lights, street lights, pedestrian lights, vehicular parking lights or a combination of these lights, as depicted in step 503. In step 504, the sequence of frames having detected region of interest (ROI) are binarized based on a dynamically determined threshold. Precisely, the sequence of frames is binarized by retaining top 1 percentile as the dynamically determined threshold. Now, this top 1 percentile is further processed to eliminate first level of false positives, as shown in step 505. Here, a set of candidate blobs are identified within the binarized sequence of frames based on a set of predefined features.

Following the identification of candidate blobs, the binary shapes which does not qualify the criteria marked by the predefined features are rejected. Accordingly, candidate blobs not conforming to features corresponding to geometric parameters such as, a minimum and/or maximum size bound of blob with respect to image resolution, height, width, shape, width to height ratio and other mensuration parameters, and previously identified vehicular regions gets eliminated.

Finally, in step 506, the identified set of candidate blobs are subjected to second level of false elimination whereby these candidate blobs are mapped back to the original sequence of frames to determine if the candidates are truly representative of a candidate for traffic light and can be classified into any of Red, Green or Yellow categories. The processes for Step 501-506 is same as explained above, and hence have not been described here in same detail. By employing a system or method of the present disclosure, the accuracy and efficiency of traffic light recognition may be improved.

Thus, traffic light recognition and classification system and method effectively exploits the saturation and luminance properties of traffic light for false positive elimination without compromising on throughput or processing efficiency. The foregoing description is a specific embodiment of the present disclosure. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

We claim:

1. A traffic light recognition system, comprising: a memory storing program instructions; a processor configured to execute the program instructions stored in the memory, wherein
a kernelization module, executed by the processor, is configured to:
receive a sequence of frames captured by an imaging device;
project the sequence of frames into a kernel space, and linearly separate the sequence of frames comprising at least one region of interest from environment thereof by a hyper plane;
a binarization module, executed by the processor, is configured to binarize, based on a dynamically determined threshold, the sequence of frames separated in the kernel space;
a decision tree module, executed by the processor, is configured to identify a set of candidate blobs in the binarized sequence of frames based on a set of predefined features; and
a classification module, executed by the processor, is configured to determine if the identified set of candidate blobs is a candidate for representing a traffic light.

2. The traffic light recognition system, according to claim 1, further comprising a search area minimization module, executed by the processor, configured to:
receive the plurality of images captured of a region external to the imaging device;
analyze the received plurality of images to determine a search area having a positional relationship therewith; and
set a minimized search area for transmitting an optimized search area to the kernelization module.

3. The traffic light recognition system, according to claim 1, wherein the region of interest includes traffic light, vehicle head lights, tail lights, street lights, pedestrian lights, vehicular parking lights, road signs or a combination thereof.

4. The traffic light recognition system, according to claim 1, wherein the kernelization module is configured to make the detected region of interest linearly separable from the environment thereof based on characteristic properties of the detected at least one region of interest determined to be above dynamically determined threshold values.

5. The traffic light recognition system, according to claim 4, wherein the characteristic properties of the detected at least one region of interest includes luminance and saturation properties of plurality of pixels within the detected region of interest.

6. The traffic light recognition system, according to claim 1, wherein the kernelization module is further configured to normalize the kernel space to a monochrome space.

7. The traffic light recognition system, according to claim 6, wherein the binarization module is configured to convert monochrome image separated in the monochrome space into binarize image by retaining top 1 percentile as the dynamically determined threshold.

8. The traffic light recognition system, according to claim 1, wherein the binarization module is configured to binarize the sequence of frames separated in the kernel space by retaining top 1 percentile as the dynamically determined threshold.

9. The traffic light recognition system, according to claim 1, wherein the decision tree module is configured to perform first level of false positive elimination, identify the set of candidate blobs within the binarized sequence of frames based on the set of predefined features that corresponds to geometric parameters as well as identified vehicle regions.

10. The traffic light recognition system, according to claim 9, some of the predefined features that corresponds to geometric parameters comprising a minimum and/or maximum size bound of blobs with respect to image resolution, height, width, shape, width to height ratio and other mensuration parameters.

11. The traffic light recognition system, according to claim 9, wherein the classification module is further configured to perform second level of false positive elimination by mapping the identified set of candidate blobs back to the original sequence of frames and determining if the mapped set of candidate blobs is the candidate for representing the traffic light.

12. A traffic light recognition method, wherein the method is implemented by a processor executing program instructions stored in a memory, the method comprising:
receiving a sequence of frames captured by an imaging device;
projecting the sequence of frames into a kernel space;
linearly separating the sequence of frames comprising at least one region of interest from environment thereof by a hyper plane;
binarizing, based on a dynamically determined threshold, the sequence of frames separated in the kernel space;
identifying a set of candidate blobs in the binarized sequence of frames based on a set of predefined features; and
determining if the identified set of candidate blobs is a candidate for representing a traffic light.

13. The traffic light recognition method, according to claim 12, further comprising:
receiving the sequence of frames captured of a region external to the imaging device;
analyzing the received sequence of frames to determine a search area having a positional relationship therewith; and
setting a minimized search area for transmitting an optimized search area for kernelization.

14. The traffic light recognition method, according to claim 12, wherein the region of interest includes traffic light, vehicle head lights, tail lights, street lights, pedestrian lights, vehicular parking lights, road signs or a combination thereof.

15. The traffic light recognition method, according to claim 12, wherein the detected region of interest is made linearly separable from the environment thereof based on characteristic properties of the detected at least one region of interest determined to be above dynamically determined threshold values.

16. The traffic light recognition method, according to claim 15, wherein the characteristic properties of the detected at least one region of interest includes luminance and saturation properties of plurality of pixels within the detected region of interest.

17. The traffic light recognition method, according to claim 12, further comprising normalizing the kernel space to a monochrome space.

18. The traffic light recognition method, according to claim 17, further comprising converting monochrome image separated in the monochrome space into binarize image by retaining top 1 percentile as the dynamically determined threshold.

19. The traffic light recognition method, according to claim 12, further comprising binarizing the sequence of frames separated in the kernel space by retaining top 1 percentile as the dynamically determined threshold.

20. The traffic light recognition method, according to claim 12, further performing first level of false positive elimination, identifying the set of candidate blobs within the binarized sequence of frames based on the set of predefined features that corresponds to geometric parameters as well as identified vehicle regions.

21. The traffic light recognition method, according to claim 20, some of the predefined features that corresponds to geometric parameters comprising a minimum and/or maximum size bound of blobs with respect to image resolution, height, width, shape, width to height ratio and other mensuration parameters.

22. The traffic light recognition method, according to claim 20, further performing second level of false positive elimination by mapping the identified set of candidate blobs back to the original sequence of frames and determining if the mapped set of candidate blobs is the candidate for representing the traffic light.

* * * * *